United States Patent
Miyamae et al.

(10) Patent No.: US 10,479,899 B2
(45) Date of Patent: Nov. 19, 2019

(54) METHOD FOR PREPARING CATIONIC ELECTRODEPOSITION COATING COMPOSITION

(71) Applicant: NIPPON PAINT AUTOMOTIVE COATINGS CO., LTD, Osaka (JP)

(72) Inventors: Nobuhiro Miyamae, Hirakata (JP); Masayuki Kotani, Hirakata (JP); Tetsuya Ohara, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 0 days.

(21) Appl. No.: 15/555,180

(22) PCT Filed: Mar. 4, 2016

(86) PCT No.: PCT/JP2016/056850
§ 371 (c)(1),
(2) Date: Sep. 1, 2017

(87) PCT Pub. No.: WO2016/143706
PCT Pub. Date: Sep. 15, 2016

(65) Prior Publication Data
US 2018/0051181 A1 Feb. 22, 2018

(30) Foreign Application Priority Data
Mar. 6, 2015 (JP) .................................. 2015-044622

(51) Int. Cl.
| | | |
|---|---|---|
| *C09D 5/44* | (2006.01) | |
| *C09D 163/00* | (2006.01) | |
| *C25D 13/04* | (2006.01) | |
| *C09D 175/04* | (2006.01) | |
| *C25D 13/06* | (2006.01) | |
| *C09D 7/40* | (2018.01) | |

(52) U.S. Cl.
CPC .............. *C09D 5/4446* (2013.01); *C09D 5/44* (2013.01); *C09D 5/4465* (2013.01); *C09D 5/4473* (2013.01); *C09D 7/40* (2018.01); *C09D 163/00* (2013.01); *C09D 175/04* (2013.01); *C25D 13/04* (2013.01); *C25D 13/06* (2013.01)

(58) Field of Classification Search
CPC .......... C09D 5/4446; C09D 7/40; C09D 5/44; C09D 5/4465; C09D 5/4473; C09D 163/00; C09D 175/04; C25D 13/04; C25D 13/06
USPC ........................................................ 524/320
See application file for complete search history.

(56) References Cited

U.S. PATENT DOCUMENTS

| | | | | |
|---|---|---|---|---|
| 5,446,077 | A * | 8/1995 | Yamada | C08G 18/003 204/502 |
| 5,908,912 | A | 6/1999 | Kollah et al. | |
| 6,265,079 | B1 | 7/2001 | Nishiguchi et al. | |
| 6,475,366 | B1 | 11/2002 | Nishiguchi et al. | |
| 6,624,215 | B1 * | 9/2003 | Hiraki | C09D 5/086 502/170 |
| 6,660,385 | B2 | 12/2003 | Nishiguchi et al. | |
| 8,980,078 | B2 * | 3/2015 | Inbe | C08G 18/58 205/317 |
| 2005/0194253 | A1 | 9/2005 | Hanatani et al. | |
| 2010/0300885 | A1 | 12/2010 | Nishiguchi et al. | |
| 2011/0062026 | A1 | 3/2011 | Nishiguchi et al. | |

FOREIGN PATENT DOCUMENTS

| | | | |
|---|---|---|---|
| EP | 1 046 683 | 10/2000 | |
| JP | 3293633 | 6/2002 | |
| JP | 2004-339524 | 12/2004 | |
| JP | 3874386 | 1/2007 | |
| JP | 2008-231142 | 10/2008 | |
| JP | 2013-56961 | 3/2013 | |
| JP | 2015-187199 | 10/2015 | |
| WO | WO-2013035765 A1 * | 3/2013 | C08G 18/58 |

OTHER PUBLICATIONS

International Search Report dated May 17, 2016 in International Application No. PCT/JP2016/056850.
International Preliminary Report on Patentability dated Sep. 21, 2017 in International Application No. PCT/JP2016/056850.
Extended European Search Report dated Aug. 6, 2018 in corresponding European patent application No. 16761676.2.

* cited by examiner

*Primary Examiner* — Josephine L Chang
(74) *Attorney, Agent, or Firm* — Wenderoth, Lind & Ponack, L.L.P.

(57) ABSTRACT

The objective of the present invention is to provide a method for preparing a cationic electrodeposition coating composition that contains a bismuth compound and exhibits excellent coating material stability, curability, coating film appearance and the like. The present invention provides a method for preparing a cationic electrodeposition coating composition, which comprises a step for mixing a resin emulsion (i) and a pigment-dispersed paste, and wherein: the resin emulsion (i) contains an aminated resin (A) and a blocked isocyanate curing agent (B); the pigment-dispersed paste contains a bismuth mixture (C) that is obtained by mixing a bismuth compound (c1) and an organic acid (c2) in advance, a pigment-dispersed resin (D), an amine-modified epoxy resin emulsion (ii) that contains an amine-modified epoxy resin (E), and a pigment (F); the pigment-dispersed resin (D) has a hydroxyl number of 20-120 mgKOH/g; and the amine-modified epoxy resin (E) has a hydroxyl number of 150-650 mgKOH/g.

10 Claims, No Drawings

METHOD FOR PREPARING CATIONIC ELECTRODEPOSITION COATING COMPOSITION

TECHNICAL FIELD

The present invention relates to a method for preparing a cationic electrodeposition coating composition.

BACKGROUND ART

Cationic electrodeposition coating compositions usually contain a resin emulsion and a pigment dispersion paste. In such a cationic electrodeposition coating composition, an organic tin compound has been widely used as the curing catalyst so far. However, the organic tin compound may probably be limited in its use by a trend to environmental regulation. It is therefore necessary to develop a catalyst as a substitute for the organic tin compound.

Studies are being made that use a bismuth compound as the curing catalyst for the cationic electrodeposition coating composition. However, the catalyst activity of a bismuth compound such as bismuth oxide or bismuth hydroxide is not adequate and therefore the resulting coating film cannot be sufficiently cured only by simply dispersing the bismuth compound in a pigment dispersion paste. This also poses a problem that addition of the bismuth compound in a cationic electrodeposition coating composition deteriorates a storage stability of a coating composition or pigment dispersion paste, causing coagulation during storage.

A method is disclosed in which after a bismuth compound is mixed and dissolved in advance in an amine-containing carboxylic acid such as an amino acid, the obtained mixture is used to prepare a pigment dispersion paste (Patent Document 1: Japanese Patent No. 3293633). Also, a method is disclosed in which after a bismuth compound is mixed and dissolved in advance in lactic acid, the obtained mixture is added to a coating material (Patent Document 2: Japanese Patent No. 3874386). As described in these documents, these methods each have the advantage that the activity of the catalyst is improved by dissolving bismuth in advance. In these methods, on the other hand, it is necessary to use a large amount of acid to dissolve bismuth in advance. The use of a large amount of acid to dissolve bismuth also gives rise to problems concerning increase in the electroconductivity of an electrodeposition coating composition, deterioration in electrodeposition coating workability, and deterioration in the appearance of the obtained coating film.

PRIOR ART DOCUMENTS

Patent Documents

Patent Document 1: Japanese Patent No. 3293633
Patent Document 2: Japanese Patent No. 3874386

DISCLOSURE OF INVENTION

Technical Problems

The present invention is made to solve the above prior art problems and it is an object of the present invention to provide a method for preparing a bismuth compound-containing cationic electrodeposition coating composition which is superior in stability of coating composition, curability and coating appearance and the like.

Solution to Problems

The present invention provides the following aspects to solve the above problems.

[1] A method for preparing a cationic electrodeposition coating composition comprising a step of mixing a resin emulsion (i) and a pigment dispersion paste, wherein
the resin emulsion (i) comprises an aminated resin (A) and a blocked isocyanate curing agent (B),
the pigment dispersion paste comprises a bismuth mixture (C) obtained by mixing a bismuth compound (c1) and an organic acid (c2) in advance; a pigment dispersion resin (D); an amine-modified epoxy resin emulsion (ii) comprising an amine-modified epoxy resin (E); and a pigment (F),
the pigment dispersion resin (D) has a hydroxyl value of 20 to 120 mg KOH/g,
the amine-modified epoxy resin (E) has a hydroxyl value of 150 to 650 mg KOH/g,
the pigment dispersion paste is prepared according to any one of the following methods of:
  mixing the bismuth mixture (C) and the pigment dispersion resin (D), then the obtained mixture being mixed with the amine-modified epoxy resin emulsion (ii), and next, the pigment (F) being mixed in the obtained mixture;
  mixing the bismuth mixture (C), the pigment dispersion resin (D) and the amine-modified epoxy resin emulsion (ii), and then the pigment (F) being mixed in the obtained mixture; or
  mixing the bismuth mixture (C) and the amine-modified epoxy resin emulsion (ii), and then, the obtained mixture, the pigment dispersion resin (D) and the pigment (F) being mixed.

[2] The method for preparing a cationic electrodeposition coating composition, wherein;
the cationic electrodeposition coating composition obtained by the method comprises the bismuth compound (c1) in an amount of 0.05 to 1.0% by mass in terms of metal element based on a resin solid content of the resin emulsion (i).

[3] The method for preparing a cationic electrodeposition coating composition, wherein;
a ratio of pigment (F)/pigment dispersion resin (D) in the pigment dispersion paste is 1/0.1 to 1/1 in terms of solid content mass ratio; and
a ratio of pigment (F)/amine-modified epoxy resin (E) in the pigment dispersion paste is 1/0.02 to 1/0.3 in terms of solid content mass ratio.

[4] The method for preparing a cationic electrodeposition coating composition, wherein;
the amine-modified epoxy resin (E) has a number average molecular weight of 1000 to 5000, and
a milligram equivalent (MEQ (B)) of a base per 100 g of the solid content of the amine-modified epoxy resin (E) is 50 to 350.

[5] The method for preparing a cationic electrodeposition coating composition, wherein;
the amine-modified epoxy resin emulsion (ii) is an emulsion neutralized with one or more acid(s) selected from the group consisting of formic acid, acetic acid and lactic acid.

[6] The method for preparing a cationic electrodeposition coating composition, wherein;
the organic acid (c2) is one or more selected from the group consisting of lactic acid, dimethylolpropionic acid and methanesulfonic acid.

[7] The method for preparing a cationic electrodeposition coating composition, wherein;

the cationic electrodeposition coating composition further comprises a salt (G) of a rare earth metal selected from the group consisting of neodymium, yttrium, lanthanum, cerium, praseodymium, and ytterbium.

[8] A cationic electrodeposition coating composition obtained by the method for preparing a cationic electrodeposition coating composition.

[9] A cationic electrodeposition coating composition comprising a resin emulsion (i) and a pigment dispersion paste, wherein;

the resin emulsion (i) comprises an aminated resin (A) and a blocked isocyanate curing agent (B), the pigment dispersion paste comprises a bismuth mixture (C) obtained by mixing a bismuth compound (c1) and an organic acid (c2) in advance; a pigment dispersion resin (D); an amine-modified epoxy resin emulsion (ii) comprising an amine-modified epoxy resin (E); and a pigment (F), the pigment dispersion resin (D) has a hydroxyl value of 20 to 120 mg KOH/g, the amine-modified epoxy resin (E) has a hydroxyl value of 150 to 650 mg KOH/g, and has a number average molecular weight of 1000 to 5000, a milligram equivalent (MEQ (B)) of a base per 100 g of the solid content of the amine-modified epoxy resin (E) is 50 to 350, and the pigment dispersion paste is prepared according to any one of the following methods of:

mixing the bismuth mixture (C) and the pigment dispersion resin (D), then the obtained mixture being mixed with the amine-modified epoxy resin emulsion (ii), and next, the pigment (F) being mixed in the obtained mixture;

mixing the bismuth mixture (C), the pigment dispersion resin (D) and the amine-modified epoxy resin emulsion (ii), and then the pigment (F) being mixed in the obtained mixture; or mixing the bismuth mixture (C) and the amine-modified epoxy resin emulsion (ii), and then, the obtained mixture, the pigment dispersion resin (D) and the pigment (F) being mixed.

[10] The cationic electrodeposition coating composition, wherein the coating composition further comprises a salt (G) of a rare earth metal selected from the group consisting of neodymium, yttrium, lanthanum, cerium, praseodymium, and ytterbium.

Advantageous Effects of Invention

The method for preparing a cationic electrodeposition coating composition of the present invention can provide a cationic electrodeposition coating composition containing a bismuth compound, which is superior in stability of coating composition, curability, coating appearance and the like. Furthermore, the method of the present invention has an advantage that a cationic electrodeposition coating composition can be more easily prepared, because the method of the present invention does not require an aqueous solution preparation of bismuth compound having low solubility in aqueous solvent. The preparation method of the present invention can easily prepare a cationic electrodeposition coating composition having excellent stability of coating composition, curability, coating appearance, even if it contains substantially no organic tin compound.

MODE FOR CARRYING OUT THE INVENTION

Background of the Invention

First, explanations will be furnished as to the circumstances that led to the present invention. The inventors of the present invention have made studies to disperse bismuth in a pigment dispersion paste with the intention of dispersing a bismuth component stably in an electrodeposition coating composition. In these studies, it was found that when a bismuth compound was mixed with an acid component in advance prior to addition, bismuth was put into a fine state which improved catalyst activity and curability. On the other hand, it has been found that when the bismuth compound is mixed with an acid component in advance and is included in a pigment dispersion paste, there is a possibility that troubles such as generation of aggregates in the pigment dispersion paste may occur. This phenomenon seems to be due to aggregation of the pigment due to inclusion of finely-dispersed bismuth in the pigment dispersion paste containing a pigment at a high concentration, thereby generating aggregates. As agglomerates are generated, color unevenness or the like occurs in an electrodeposition coating film, which provides disadvantage of deterioration of coating film appearance.

The inventors of the present invention intended to solve the above problem with improving the catalyst activity of a bismuth compound, as well as preventing generation of pigment aggregation even when a pigment dispersion paste contains a bismuth compound. Then, the inventors of the present invention found in an experiment that use of an amine-modified epoxy resin in addition to conventionally-used pigment dispersion resin in a preparation of a pigment dispersion paste improved stability of a pigment dispersion paste even when it contains finely-dispersed bismuth, to complete the present invention. The method for preparing a cationic electrodeposition coating composition of the present invention will be hereinafter explained in detail.

Preparation of Cationic Electrodeposition Coating Composition

The method for preparing a cationic electrodeposition coating composition of the present invention includes a step of mixing a resin emulsion (i) and a pigment dispersion paste. The resin emulsion (i) contains an aminated resin (A) and a blocked isocyanate curing agent (B). The pigment dispersion paste contains a bismuth mixture (C) obtained by mixing a bismuth compound (c1) and an organic acid (c2) in advance; a pigment dispersion resin (D); an amine-modified epoxy resin emulsion (ii) containing an amine-modified epoxy resin (E); and a pigment (F).

Resin Emulsion (i)

The resin emulsion (i) contains an aminated resin (A) and a blocked isocyanate curing agent (B). The resin emulsion (i) may additionally contain another component, if necessary.

Aminated Resin (A)

The aminated resin (A) is a coating film-forming resin constituting an electrodeposition coating film. An amine-modified epoxy resin obtained by modifying an oxirane ring in an epoxy resin skeleton by an amine compound is preferable as the aminated resin (A). The amine-modified epoxy resin is generally prepared by ring-opening an oxirane ring in a starting material resin molecule through a reaction with an amine compound such as a primary amine, secondary amine, or tertiary amine, and/or its acid salt. A typical example of the starting material resin is polyphenol polyglycidyl ether type epoxy resins which are reaction products of polycyclic phenol compounds such as bisphenol A, bisphenol F, bisphenol S, phenol novolak, or cresol novolak, and epichlorohydrin. Also, other examples of the starting material resin may include oxazolidone ring-containing epoxy resins described in JP 1993-306327 A. These epoxy resins may be prepared by a reaction between a bisurethane compound and epichlorohydrin, in which the bisurethane compound is obtained by blocking a diisocyanate compound or an isocyanate group of a diisocyanate compound with a lower alcohol such as methanol or ethanol.

The above starting material resin may be used after it is chain-elongated by a difunctional polyesterpolyol, polyether polyol, or bisphenols, or dibasic carboxylic acid before the ring-opening reaction of an oxirane ring is undergone by an amine compound.

Also, the starting material resin may be used after adding a monohydroxy compound such as 2-ethylhexanol, nonylphenol, ethylene glycol mono-2-ethylhexyl ether, ethylene glycol mono-n-butyl ether, or propylene glycol mono-2-ethylhexyl ether, or monocarboxylic acid compound such as octylic acid to a part of an oxirane ring for the purpose of adjusting a molecular weight or amine equivalent or improving heat-flow characteristics before the ring-opening reaction of an oxirane ring is undergone by an amine compound.

An amine-modified epoxy resin is obtained by reacting an oxirane ring of the above epoxy resin with an amine compound. Examples of the amine compound to be reacted with the oxirane ring include primary amines and secondary amines. When an epoxy resin is reacted with a secondary amine, an amine-modified epoxy resin having a tertiary amino group is obtained. Also, when an epoxy resin is reacted with a primary amine, an amine-modified epoxy resin having a secondary amino group is obtained. Moreover, an amine-modified epoxy resin having a primary amino group can be prepared by using a secondary amine having a blocked primary amine. For example, an amine-modified epoxy resin having a primary amino group and secondary amino group can be prepared by blocking the primary amino group with ketone to obtain ketimine before reacting with the epoxy resin and then, the obtained ketimine is then introduced into the epoxy resin, followed by deblocking. In this case, a tertiary amine may optionally be used as the amine to be reacted with the oxirane ring.

Examples of the primary amine and secondary amine include butylamine, octylamine, diethylamine, dibutylamine, methylbutylamine, monoethanolamine, diethanolamine, and N-methylethanolamine. Examples of the secondary amine having a blocked primary amine include ketimines of aminoethylethanolamine and diketimines of diethylenetriamine. Also, examples of the tertiary amine which may optionally be used include triethylamine, N,N-dimethylbenzylamine, and N,N-dimethylethanolamine. These amines may be used either singly or in combinations of two or more.

As the amine compound to be reacted with an oxirane ring of the above epoxy resin, those including 50 to 95% by mass of a secondary amine, 0 to 30% by mass of a secondary amine having a blocked primary amine, and 0 to 20% by mass of a primary amine are preferable.

A number average molecular weight of the aminated resin (A) is preferably in a range from 1,000 to 5,000. When the number average molecular weight is 1,000 or more, the properties such as solvent resistance and corrosion resistance of the obtained cured electrodeposition coating film are improved. When the number average molecular weight is 5,000 or less, on the other hand, the viscosity of the aminated resin can be easily controlled, which makes smooth synthesis possible and also, the emulsification and dispersion of the obtained aminated resin (A) are easily handled. The number average molecular weight of the aminated resin (A) may more preferably be in a range from 2,000 to 3,500.

In the specification, the number average molecular weight is a number average molecular weight based on polystyrene as measured by gel permeation chromatography (GPC).

An amine value of the aminated resin (A) is preferably in a range from 20 to 100 mg KOH/g. When the amine value of the aminated resin (A) is 20 mg KOH/g or more, the emulsification and dispersion stability of the aminated resin (A) in the electrodeposition coating composition is improved. When the amine value is 100 mg KOH/g or less on the other hand, the amount of amino groups in the cured electrodeposition coating film is appropriate, which eliminates a fear of deterioration in the water resistance of the coating film. The amine value of the aminated resin (A) is more preferably in a range from 20 to 80 mg KOH/g.

A hydroxyl value of the aminated resin (A) is preferably in a range from 150 to 650 mg KOH/g. When the hydroxyl value is 150 mg KOH/g or more, the curing of the cured electrodeposition coating film is improved and therefore, the appearance of the coating film is improved. When the hydroxyl value is 650 mg KOH/g or less on the other hand, the amount of hydroxyl groups left in the cured electrodeposition coating film is proper, which eliminates a fear of deterioration in the water resistance of the coating film. The hydroxyl value of the aminated resin (A) is more preferably in a range from 180 to 300 mg KOH/g.

In the electrodeposition coating composition of the present invention, in case that an aminated resin (A) having a number average molecular weight ranging from 1,000 to 5,000, an amine value ranging from 20 to 100 mg KOH/g, and a hydroxyl value ranging from 150 to 650 mg KOH/g is used, the resulting electrodeposition coating composition has the advantage that it can impart high corrosion resistance to an object to be coated.

As the aminated resin (A), aminated resins having different amine values and/or hydroxyl values may optionally be used in combination. When two or more aminated resins differing in amine value and hydroxyl value are used in combination, an average amine value and average hydroxyl value calculated based on the mass ratio of these aminated resins to be used are preferably in the above defined ranges. Also, the aminated resin (A) used in combination may preferably be a combination of an aminated resin having an amine value of 20 to 50 mg KOH/g and a hydroxyl value of 50 to 300 mg KOH/g and an aminated resin having an amine value of 50 to 200 mg KOH/g and a hydroxyl value of 200 to 500 mg KOH/g. The use of such a combination has the advantage that the core portion of the emulsion is made more hydrophobic and the shell portion of the emulsion is made more hydrophilic and the aminated resin (A) can therefore impart excellent corrosion resistance.

The aminated resin (A) may optionally contain an amino group-containing acrylic resin, amino group-containing polyester resin, and the like.

Blocked Isocyanate Curing Agent (B)

The blocked isocyanate curing agent (B) (hereinafter also simply referred to as "curing agent (B)") is a coating film-forming resin constituting the electrodeposition coating film. The blocked isocyanate curing agent (B) may be prepared by blocking polyisocyanate with a capping agent.

Examples of the polyisocyanate include aliphatic diisocyanates such as hexamethylene diisocyanate (including trimers), tetramethylene diisocyanate, and trimethylhexamethylene diisocyanate, alicyclic polyisocyanates such as isophorone diisocyanate and 4,4'-methylenebis(cyclohexylisocyanate), and aromatic diisocyanates such as 4,4'-diphenylmethanediisocyanate, tolylene diisocyanate, and xylylene diisocyanate.

As the capping agent, monohydric alkyl (or aromatic) alcohols such as n-butanol, n-hexyl alcohol, 2-ethylhexanol, lauryl alcohol, phenol carbinol, and methylphenyl carbinol; cellosolves such as ethylene glycol monohexyl ether and ethylene glycol mono2-ethylhexyl ether; polyether type both-terminal diols such as polyethylene glycol, polypropylene glycol, and polytetramethylene ether glycol phenol; polyester type both-terminal polyols obtained by reacting diols such as ethylene glycol, propylene glycol, and 1,4-butanediol with dicarboxylic acids such as oxalic acid, succinic acid, adipic acid, suberic acid, and sebacic acid; phenols such as para-t-butylphenol and cresol; oximes such as dimethyl ketoxime, methylethyl ketoxime, methylisobutyl ketoxime, methylamyl ketoxime, and cyclohexanone oxime; and lactams represented by ç-caprolactam and γ-caprolactam may preferably be used.

The blocking ratio of the blocked isocyanate curing agent (B) is preferably 100%. This has the advantage that the storage stability of the electrodeposition coating composition is improved.

The blocked isocyanate curing agent (B) may preferably be a combination of a curing agent prepared by blocking an aliphatic diisocyanate with a capping agent and a curing agent prepared by blocking an aromatic diisocyanate with a capping agent.

The blocked isocyanate curing agent (B) reacts preferentially with a primary amine of the aminated resin (A) and further reacts with a hydroxyl group to cure. As the curing agent, at least one curing agent selected from the group consisting of organic curing agents such as a melamine resin or phenol resin, silane coupling agents, and metal curing agents may optionally be used in combination with the blocked isocyanate curing agent (B).

Preparation of Resin Emulsion (i)

The resin emulsion (i) can be prepared by respectively dissolving the aminated resin (A) and blocked isocyanate curing agent (B) in organic solvents to prepare respective solutions, which are then mixed and next, the mixture is neutralized by using a neutralizing acid. Examples of the neutralizing acid include organic acids such as methanesulfonic acid, sulfamic acid, lactic acid, dimethylolpropionic acid, formic acid, and acetic acid. In the present invention, it is more preferable to neutralize a resin emulsion containing the aminated resin (A) and curing agent (B) by one or more acids selected from the group consisting of formic acid, acetic acid, and lactic acid.

A solid content of the curing agent (B) is so designed that the curing agent (B) is used in an amount sufficient to react with active hydrogen-containing functional groups such as a primary amino group, secondary amino group, or hydroxyl group in the aminated resin (A) during curing to provide a satisfactory cured coating film. The content of the curing agent (B) is in a range preferably 90/10 to 50/50 and more preferably 80/20 to 65/35 in terms of solid content mass ratio of aminated resin (A)/curing agent (B). The fluidity and curing rate of the coating film (deposited film) in the formation of the film are improved, leading to improved coating appearance by controlling the solid content mass ratio of aminated resin (A)/curing agent (B).

A solid content of the resin emulsion may ordinarily be within a range of 25 to 50% by mass, especially within a range of 35 to 45% by mass, based on total mass of resin emulsion. The term "a solid content of the resin emulsion" used herein means total mass amounts of all components remaining as a solid by removal of the solvent contained in the resin emulsion. More specifically, it means total mass amounts of the aminated resin (A), the blocked isocyanate curing agent (B) and, if necessary, solid components optionally added in the resin emulsion.

The neutralizing acid is used in an amount of more preferably 10 to 100% and even more preferably 20 to 70% in terms of equivalent ratio of the neutralizing acid per the equivalent of an amino group of the aminated resin (A). In the specification, the equivalent ratio of the neutralizing acid per the equivalent of an amino group of the aminated resin (A) is defined as neutralization index. When the neutralization index is 10% or more, this ensures affinity to water and improves water dispersibility.

Pigment Dispersion Paste

The pigment dispersion paste used in the method of the present invention comprises a bismuth mixture (C) obtained by mixing a bismuth compound (c1) and an organic acid (c2) in advance; a pigment dispersion resin (D); an amine-modified epoxy resin emulsion (ii) comprising an amine-modified epoxy resin (E); and a pigment (F).

Bismuth Mixture (C)

The bismuth mixture is a mixture prepared by mixing the bismuth compound (c1) and organic acid (c2) in advance in the preparation of the pigment dispersion paste. In the preparation of the pigment dispersion paste, the bismuth compound (c1) and organic acid (c2) are mixed in advance to thereby disperse the bismuth compound in a fine state, whereby high catalyst activity can be obtained.

The bismuth compound (c1) is a compound containing a bismuth metal and examples of the bismuth compound (c1) include bismuth oxide, bismuth hydroxide, bismuth nitride, or mixtures of them. The bismuth compound (c1) is preferably at least one type selected from the group consisting of bismuth oxide and bismuth hydroxide.

As the bismuth compound (c1), a powder-shaped one is used. An average particle diameter of the bismuth compound (c1) is preferably 0.5 to 20 μm and more preferably 1 to 3 μm. In the specification, the average particle diameter is a volume average particle diameter D50 and means a value measured by using a laser doppler particle size analyzer ("Microtrac UPA$_{150}$, manufactured by Nikkiso Co., Ltd.) and by diluting the dispersion with ion exchange water in such a manner as to obtain an appropriate signal level.

An amount of the bismuth compound (c1) contained in the electrodeposition coating composition of the present invention may preferably be 0.05 to 1.0% by mass in terms of metal element based on the resin solid content of the resin emulsion (i) contained in the electrodeposition coating composition. When the bismuth compound (c1) is in the above range, the resin component in the resin emulsion (i) is successfully cured and also, the storage stability of the electrodeposition coating composition can be satisfactorily kept.

In the specification, "a resin solid content of the resin emulsion (i)" means a total solid content by mass of resin components in the resin emulsion (i) and specifically, the total solid content by mass of the aminated resin (A) and the curing agent (B).

In the specification, "in terms of metal element" means that the content of a metal compound is multiplied by a metal element conversion factor (which is a factor used to convert the amount of a metal compound into the amount of a metal element and specifically means a value obtained by dividing the atomic amount of the metal element in the metal compound by the molecular weight of the metal compound) to find the target amount of metal element. When, for example, the bismuth compound (c1) is bismuth oxide ($Bi_2O_3$, molecular weight: 466), the amount of bismuth in terms of metal element in an electrodeposition coating composition containing bismuth oxide in an amount of 0.5% by mass based on the resin solid content of the resin emulsion (i) is found to be 0.448% by mass by calculation from the formula: 0.5% by mass×(418÷466).

Organic Acid (c2)

The organic acid (c2) is one or more compounds selected from the group consisting of hydroxycarboxylic acid and sulfonic acid.

Examples of the hydroxycarboxylic acid include the following compounds;

monohydroxymonocarboxylic acids having a total of 2 to 5 and preferably 2 to 4 carbon atoms such as lactic acid and glycolic acid and particularly, aliphatic monohydroxymonocarboxylic acids;

monohydroxydicarboxylic acids having a total of 2 to 5 and preferably 2 to 4 carbon atoms such as hydroxymalonic acid and malic acid and particularly, aliphatic monohydroxydicarboxylic acids;

dihydroxymonocarboxylic acids having a total of 3 to 7 and preferably 3 to 6 carbon atoms such as dimethylolpropionic acid (DMPA) and glyceric acid and particularly, aliphatic dihydroxymonocarboxylic acids;

dihydroxydicarboxylic acids having a total of 3 to 6 and preferably 3 to 5 carbon atoms such as tartaric acid and racemic acid and particularly, aliphatic dihydroxydicarboxylic acids;

The sulfonic acid is organic sulfonic acids and examples of the sulfonic acid include alkanesulfonic acids having a total of 1 to 5 and preferably 1 to 3 carbon atoms such as methanesulfonic acid and ethanesulfonic acid.

It is preferable to use one or more types selected from the group consisting of monohydroxymonocarboxylic acids, dihydroxymonocarboxylic acids, and alkanesulfonic acids as the organic acid (c2). It is more preferable to use one or more types selected from the group consisting of lactic acid, dimethylolpropionic acid, and methanesulfonic acid as the organic acid (c2).

No particular limitation is imposed on the using form of the organic acid (c2) and examples of the using form include a solid form, liquid form, and solution form with a solute dissolved in a solvent and particularly, an aqueous solution form.

The contents of the bismuth compound (c1) and organic acid (c2) in the bismuth mixture (C) are so designed that the molar ratio (Bi:organic acid) of a bismuth metal in the bismuth compound (c1) to the organic acid (c2) is 1:0.5 to 1:4 and more preferably 1:1 to 1:2.

Pigment Dispersion Resin (D)

The pigment dispersion resin (D) is a resin for improving the dispersion ability of the pigment (F) and is dispersed in an aqueous medium prior to use. As the pigment dispersion resin, a pigment dispersion resin having a cationic group such as a modified epoxy resin having one or more types selected from the group consisting of a quaternary ammonium group and tertiary sulfonium group may be used. For example, a modified epoxy resin having a quaternary ammonium group may be prepared by reacting an epoxy resin and tertiary amine. As the aqueous medium, ion exchange water, water containing a small amount of alcohols, or the like is used.

The hydroxyl value of the pigment dispersion resin (D) is 20 to 120 mg KOH/g. In respect of the hydroxyl value, the pigment dispersion resin (D) is distinguished from the amine-modified epoxy resin (E) described in detail below. A pigment dispersion resin having such a hydroxyl value may be prepared by reacting half-blocked isocyanate with a hydroxyl group of an epoxy resin having the hydroxyl group to thereby introduce a blocked isocyanate group.

As the above epoxy resin, a polyepoxide is generally used. This epoxide has an average of two or more 1,2-epoxy groups in one molecule. Useful examples of such a polyepoxide include the aforementioned epoxy resins.

The half-blocked isocyanate used to react with an epoxy resin is prepared by partially blocking a polyisocyanate. The reaction between the polyisocyanate and blocking agent may preferably be undergone at 40 to 50° C. under cooling in the presence of a curing catalyst (for example, a tin type catalyst) according to the need with stirring and adding dropwise a blocking agent.

There is no particular limitation to the above polyisocyanate as long as it has two or more isocyanate groups in average in one molecule. As a specific example, polyisocyanates which can be used in the preparation of the above blocked isocyanate curing agent may be used.

Examples of a proper blocking agent used to prepare the above half-blocked isocyanate include lower aliphatic alkyl monoalcohols having 4 to 20 carbon atoms. Specifically, examples of these alcohols include butyl alcohol, amyl alcohol, hexyl alcohol, 2-ethylhexyl alcohol, and heptyl alcohol.

The reaction between the above epoxy resin and half-blocked isocyanate is preferably undergone at 140° C. for about 1 hour.

As the tertiary amine, those having 1 to 6 carbon atoms are preferably used. Examples of the tertiary amine include dimethylethanolamine, trimethylamine, triethylamine, dimethylbenzylamine, diethylbenzylamine, N, N-dimethylcyclohexylamine, tri-n-butylamine, diphenetylmethylamine, dimethylaniline, and N-methylmorpholine.

Examples of the neutralizing acid which is mixed with the above tertiary amine prior to use include, though not particularly limited to, inorganic acids or organic acids such as hydrochloric acid, nitric acid, phosphoric acid, formic acid, acetic acid, and lactic acid. The reaction between the neutralized acid salt of the tertiary amine obtained in this manner and epoxy resin may be undergone according to a usual method. For example, the above epoxy resin is dissolved in a solvent such as ethylene glycol monobutyl ether and the obtained solution is heated to 60 to 100° C. Then, the neutralized acid salt of the tertiary amine is added dropwise to this solution until the acid value of the reaction mixture reaches 1 with keeping the mixture at 60 to 100° C.

The epoxy equivalent of the above pigment dispersion resin (D) is preferably 1000 to 1800. This epoxy equivalent is more preferably 1200 to 1700. Also, the number average molecular weight of the pigment dispersion resin (D) is preferably 1500 to 2700.

The above pigment dispersion (D) preferably contains 35 to 70 meq (mg equivalent) of a quaternary ammonium group per 100 g of the pigment dispersion resin (D), more preferably, 35 to 55 meq of a quaternary ammonium group per 100 g. When the amount of the quaternary ammonium group is in the above range, this has the advantage that the pigment dispersion ability is improved and the electrodeposition coating composition is improved in coating workability.

Amine-Modified Epoxy Resin (E) and Amine-Modified Epoxy Resin Emulsion (ii)

The preparation method of the present invention is characterized in that an amine-modified epoxy resin (E) is used in preparation of the pigment dispersion paste. The amine-modified epoxy resin (E) is distinguished from the above pigment dispersion resin (D) in respect that a hydroxyl value of the amine-modified epoxy resin (E) is 150 to 650 mg KOH/g. Using the amine-modified epoxy resin (E) in a preparation of the pigment dispersion paste can provide improved dispersion stability of the pigment dispersion paste containing bismuth compound (c1).

The amine-modified epoxy resin (E) can be prepared by reacting an oxirane ring in an epoxy resin skeleton with an amine compound to modify it. The amine-modified epoxy resin (E) can be prepared in the same manner as the above amine-modified epoxy resin described in the aminated resin (A). As the amine-modified epoxy resin (E), the amine-modified epoxy resin described in the aminated resin (A) may be used as it is. As the amine-modified epoxy resin (E) and the amine-modified epoxy resin of the aminated resin (A), a same resin may be used, and different resins may also be used.

In a preparation of the amine-modified epoxy resin (E), an amine for reacting an oxirane ring in an epoxy resin may preferably contain 50 to 95% by mass of a secondary amine, 0 to 30% by mass of a secondary amine having a blocked primary amine, and 0 to 20% by mass of a primary amine.

A number average molecular weight of the amine-modified epoxy resin (E) is preferably in a range from 1,000 to 5,000. When the number average molecular weight is within the above range, excellent pigment dispersion stability can be obtained and may be preferred. The number average molecular weight of the amine-modified epoxy resin (E) may more preferably be in a range from 2,000 to 3,500. When the number average molecular weight of the amine-modified epoxy resin (E) is 1,000 or more, the properties such as solvent resistance and corrosion resistance of the obtained cured electrodeposition coating film are improved. When the number average molecular weight of the amine-modified epoxy resin (E) is 5,000 or less, on the other hand, excellent dispersion property and dispersion stability of resultant pigment dispersion paste can be obtained.

In the amine-modified epoxy resin (E), it may be preferable that a milligram equivalent (MEQ (B)) of a base per 100 g of the solid content of the amine-modified epoxy resin (E) is 50 to 350. When the MEQ (B) of the amine-modified epoxy resin (E) deviates from the above range, particularly when the MEQ (B) is less than 50, storage stability of the pigment dispersion paste may be inferior. The milligram equivalent (MEQ (B)) of the base to 100 g of the solid content of the resin (E) can be adjusted by the kind and amount of the amine compound to be reacted in the preparation of the resin (E).

MEQ (B) stands for mg equivalent (base), which is equivalent to mg equivalent of base per 100 g of resin solids. MEQ (B) can be determined as follows;
about 10 g of solid contents of the electrodeposition coating composition is precisely weighed and dissolved in about 50 ml of a solvent (THF: tetrahydrofuran), next, 7.5 ml of acetic anhydride and 2.5 ml of acetic acid are added, then using a potentiometric titration with a 0.1 N perchloric acid acetic acid solution using a titration apparatus (for example, APB-410, manufactured by Kyoto Electronics Industry Co., Ltd.), an amount of the base-containing group in the resin (E) is determined and measured.

In the present invention, the amine-modified epoxy resin (E) used in preparing the pigment dispersion paste is prepared and used in the state of an amine-modified epoxy resin emulsion (ii). As one embodiment of a method of preparing the amine-modified epoxy resin emulsion (ii), there is a method of preparing in the same manner as the resin emulsion (i) described above. Specifically, two solutions are prepared by dissolving the amine-modified epoxy resin (E) and the blocked isocyanate curing agent (B) in an organic solvent respectively, and after mixing these solutions, the mixture is dispersed in water in use of a neutralizing acid to prepare an amine-modified epoxy resin emulsion (ii). In another embodiment of a method for preparing the amine-modified epoxy resin emulsion (ii), a solution is prepared by dissolving the amine-modified epoxy resin (E) in an organic solvent, then dispersing the resultant solution in water using a neutralizing acid to prepare an amine modified epoxy resin emulsion (ii). Examples of the neutralizing acid for preparing the amine-modified epoxy resin emulsion (ii) include organic acids such as methanesulfonic acid, sulfamic acid, lactic acid, dimethylolpropionic acid, formic acid, and acetic acid. It may be more preferable to use one or more acid selected from the group consisting of formic acid, acetic acid, and lactic acid, as a neutralizing acid.

Pigment (F)

The pigment (F) is a pigment usually used in electrodeposition coating compositions. Examples of such a pigment include inorganic pigments and organic pigments which are usually used, for example, color pigments such as titanium white (titanium dioxide), carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, and aluminum phosphomolybdate, and aluminum-zinc phosphomolybdate.

The pigment (F) is preferably used in an amount of 1 to 30% by mass based on the resin solid content of the cationic electrodeposition coating composition.

Preparation of Pigment Dispersion Paste

The pigment dispersion paste according to the present invention is prepared according to any one of the following methods.

Method 1: mixing a bismuth mixture (C) which is obtained by mixing a bismuth compound (c1) and an organic acid (c2) in advance, and the pigment dispersion resin (D), then the obtained mixture being mixed with the amine-modified epoxy resin emulsion (ii), and next, the pigment (F) being mixed in the obtained mixture.

Method 2: mixing a bismuth mixture (C) which is obtained by mixing a bismuth compound (c1) and an organic acid (c2) in advance, the pigment dispersion resin (D) and the amine-modified epoxy resin emulsion (ii), and then the pigment (F) being mixed in the obtained mixture.

Method 3: mixing a bismuth mixture (C) which is obtained by mixing a bismuth compound (c1) and an organic acid (c2) in advance, and the amine-modified epoxy resin emulsion (ii), and then, the obtained mixture, the pigment dispersion resin (D) and the pigment (F) being mixed.

In any of the above Methods 1-3, the bismuth compound (c1) and organic acid (c2) are mixed in advance ahead of other components to prepare a bismuth mixture (C). When the bismuth compound (c1) and organic acid (c2) are mixed in advance to prepare the bismuth mixture (C), the solubility of the bismuth compound is improved, thereby improving catalyst activity, which enables a formation of a coating film superior in curability and corrosion resistance.

Mixing of the bismuth compound (c1) and organic acid (c2) is performed by dispersing particles of the bismuth compound (c1) in an aqueous solution of the organic acid (c2) with stirring. Each condition such as temperature or stirring speed in the mixing may be a usual one adopted in the production of a coating composition and the mixing is performed, for example, at 10 to 30° C. and preferably at ambient temperature and a stirring speed at a level causing stirring flow. Stirring time may be properly selected corresponding to the scale of a reaction system and may be selected, for example, in a range from 0.1 to 24 hour.

In the method of the present invention, it is characterized in that both of the resin components of the pigment dispersion resin (D) and the amine-modified epoxy resin (E) are used in preparation of the pigment dispersion paste. Here, a ratio of pigment (F)/pigment dispersion resin (D) in the pigment dispersion paste may preferably be 1/0.1 to 1/1 in terms of solid content mass ratio. When an amount of the pigment dispersion resin (D) exceeds the above range, curing performance may be inferior. In addition, when an amount of the pigment dispersion resin (D) is less than the above range, poor pigment dispersion may occur.

In addition, a ratio of pigment (F)/amine-modified epoxy resin (E) in the pigment dispersion paste may preferably be 1/0.02 to 1/0.3 in terms of solid content mass ratio. When an amount of the amine-modified epoxy resin (E) is outside the above range, dispersion stability of the pigment may become inferior. Further, when an amount of the amine-modified epoxy resin (E) is 1/0.3 or more, storage stability of the pigment dispersion paste may decrease.

An embodiment (Method 1) in the procedures for preparing a pigment dispersion paste is one in which a bismuth mixture (C) obtained by mixing the bismuth compound (c1) and organic acid (c2) in advance is mixed with the pigment dispersion resin (D), the obtained mixture is mixed with the above amine-modified epoxy resin emulsion (ii), and then, the above pigment (F) is mixed in the obtained mixture.

Another embodiment (Method 2) in the procedures for preparing a pigment dispersion paste is one in which a bismuth mixture (C) obtained by mixing the bismuth compound (c1) and organic acid (c2) in advance, the pigment dispersion resin (D), and the amine-modified epoxy resin emulsion (ii) are mixed and then, the above pigment (F) is mixed in the obtained mixture.

A further embodiment (Method 3) in the procedures for preparing a pigment dispersion paste is one in which a bismuth mixture (C) obtained by mixing the bismuth compound (c1) and organic acid (c2) in advance is mixed in the above amine-modified epoxy resin emulsion (ii), then the obtained mixture is mixed with the above pigment dispersion resin (D) and pigment (F). In the embodiment of Method 3, the pigment dispersion resin (D) and the pigment (F) may be mixed in advance, separately from the mixture of the bismuth mixture (C) and the amine-modified epoxy resin emulsion (ii). Also, the pigment dispersion resin (D) and the pigment (F) may be sequentially added to the mixture of the bismuth mixture (C) and the amine-modified epoxy resin emulsion (ii) in an arbitrary order, or all the components may be added at one time.

In the embodiment of Method 3, it may be preferable that the pigment dispersion resin (D) and the pigment (F) is mixed in advance, separately from the mixture of the bismuth mixture (C) and the amine-modified epoxy resin emulsion (ii), and these two kinds of mixtures are mixed, which can provide an electrodeposition coating composition having more excellent coating film appearance.

Each condition such as temperature or stirring speed in the mixing may be a usual one adopted in the production of a coating composition, and the mixing is performed, for example, at 10 to 50° C. and preferably 20 to 40° C. and a stirring speed at a level causing stirring flow. With regard to the stirring time, it is preferable to stir until the dispersion particle size of a pigment is reduced to 10 µm or less. Here, the dispersion particle size of a pigment can be confirmed by measuring the volume average particle diameter of the pigment.

Preparation of Electrodeposition Coating Composition

The electrodeposition coating composition according to the present invention can be prepared by mixing the resin emulsion (i) and the pigment dispersion paste. A mixing ratio of the resin emulsion (i) and the pigment dispersion paste, may preferably be, in terms of solid content mass ratio, within a range of resin emulsion (i): pigment dispersion paste being 1:0.1 to 1:0.4, more preferably 1:0.15 to 1:0.3.

The electrodeposition coating composition of the present invention may contain, in addition to the above components, a salt (G) of a rare earth metal selected from the group consisting of neodymium, yttrium, lanthanum, cerium, praseodymium, and ytterbium. Examples of the salt (G) of the above rare earth metal include acetates, nitrides, sulfates, sulfamates, lactates, formates, and carbonates of the above rare earth metals.

When the electrodeposition coating composition contains the salt (G) of a rare earth metal, this has the advantage that the coating film is improved in corrosion resistance and particularly, the corrosion resistance of an edge portion (edge rust prevention) is improved. When the electrodeposition coating composition contains the salt (G) of a rare earth metal, the salt (G) is preferably contained in an amount of 0.0001 to 0.5% by mass in terms of metal element of a rare earth metal based on the total mass of a resin solid content of the resin emulsion (i).

The above salt (G) of a rare earth metal may be added in the electrodeposition coating composition by a desired method. For example, a method in which an aqueous solution of the salt (G) of a rare earth metal is prepared in advance and then added in the electrodeposition coating composition is given as an example.

The electrodeposition coating composition of the present invention may optionally contain an amino acid. When the electrodeposition coating composition contains an amino acid, the amino acid may be further mixed when the bismuth compound (c1) and organic acid (c2) are mixed in advance in the preparation of the pigment dispersion paste. When an amino acid is further mixed, an amino acid having strong chelating ability can be coordinated to the bismuth compound, thereby ensuring that the dissolution stability of the bismuth compound can be improved.

As the amino acid, for example, glycine or aspartic acid, or their mixture may be used. When an amino acid is used, the bismuth compound (c1) and amino acid are used in such an amount that the molar ratio of Bi to amino acid (Bi:amino acid) is preferably 1:0.5 to 1:4.0 and more preferably 1:1 to 1:2.

A resin solid content of the electrodeposition coating composition according to the present invention is preferably 1 to 30% by mass based on the total amount of the electrodeposition coating composition. When the resin solid content of the electrodeposition coating composition is less than 1% by mass, the amount of electrodeposition coating film to be precipitated is reduced and it may be difficult to secure satisfactory corrosion resistance. When the amount of the resin solid content of the electrodeposition coating composition exceeds 30% by mass, there is a fear of deteriorations in throwing power or coating appearance.

The electrodeposition coating composition of the present invention preferably has a pH of 4.5 to 7. When the pH of the electrodeposition coating composition is less than 4.5, this gives rise to the problem concerning deteriorated corrosion resistance and generation of sludges in electrodeposition coating. The pH of the electrodeposition coating composition can be set to the above range by controlling the amount of a neutralizing acid to be used and the amount of free acids to be added.

The pH of the electrodeposition coating composition may be measured using a commercially available pH meter having a temperature compensation function.

The mg (milligram) equivalent (MEQ (A)) of the acid per 100 g of the solid content of the electrodeposition coating composition is preferably 40 to 120. The mg equivalent (MEQ(A)) of an acid per 100 g of the resin solid content of the electrodeposition coating composition can be adjusted by the amount of a neutralizing acid and the amount of free acids.

Here, MEQ(A) is an abbreviation for mg equivalent (acid) and means the sum of mg equivalents of all acids per 100 g of the solid content of a coating. This MEQ(A) can be measured by precisely weighing about 10 g of the solid content of the electrodeposition coating composition, dissolving the weighed coating composition in about 50 ml of a solvent (THF: tetrahydrofuran), and then performing potentiometetric titration using a 1/10 N NaOH solution to thereby quantitatively measure the amount of acids to be contained.

The electrodeposition coating composition is preferably one which does not substantially contain any one of tin compounds and lead compounds. In the specification, "The electrodeposition coating composition does not substantially contain any one of tin compounds and lead compounds" means that the concentration of lead compounds contained in the electrodeposition coating composition does not exceed 50 ppm in terms of lead metal element and the concentration of tin compounds contained in the electrodeposition coating composition does not exceed 50 ppm in terms of tin metal element. The bismuth compound (c1) is contained in the electrodeposition coating composition of the present invention. For this, it is necessary to use neither a lead compound nor an organic tin compound as a curing catalyst. This enables preparation for an electrodeposition coating composition substantially containing neither a tin compound nor a lead compound.

The electrodeposition coating composition of the present invention may optionally contain additives usually used in coating fields, for example, organic solvents such as ethylene glycol monobutyl ether, ethylene glycol monohexyl ether, ethylene glycol monoethylhexyl ether, propylene glycol monobutyl ether, dipropylene glycol monobutyl ether, and propylene glycol monophenyl ether, drying preventive, surfactants such as an antifoaming agent, viscosity regulator such as acrylic resin microparticles, cissing inhibitor, and inorganic antirust agents such as vanadium salt, and a copper, iron, manganese, magnesium, or calcium salt. Also, other than these additives, known additives such as an auxiliary complexing agent, buffering agent, lubricant, stress relaxing agent, gloss agent, semi-gloss agent, antioxidant, and ultraviolet absorber may be formulated. These additives may be mixed in the preparation of the pigment dispersion paste, and may also be mixed during and after the resin emulsion and pigment dispersion paste are mixed.

The electrodeposition coating composition of the present invention may contain other coating film-forming resin components other than the above aminated resin (A). Examples of other coating film-forming resin component include an acrylic resin, polyester resin, urethane resin, butadiene type resin, phenol resin, and xylene resin. Other coating film-forming resin component may be an aminated resin which is not classified into the aforementioned aminated resin (A). A phenol resin and xylene resin are preferable as the other coating film-forming resin component which may be contained in the electrodeposition coating composition. Examples of the phenol resin and xylene resin include xylene resins having 2 to 10 aromatic rings.

The method for preparing a cationic electrodeposition coating composition of the present invention can provide a cationic electrodeposition coating composition containing a bismuth compound, which is superior in stability of coating composition, curability, coating appearance and the like. Furthermore, the method of the present invention has an advantage that a cationic electrodeposition coating composition can be more easily prepared, because the method of the present invention does not require an aqueous solution preparation of bismuth compound having low solubility in aqueous solvent. The preparation method of the present invention can easily prepare a cationic electrodeposition coating composition having excellent stability of coating composition, curability, coating appearance, even if it contains substantially no organic tin compound or lead compound.

Electrodeposition Coating and Formation of Electrodeposition Coating Film

A cured electrodeposition coating film can be formed on an object to be coated by performing electrodeposition coating on the object to be coated by using the electrodeposition coating composition of the present invention. In the electrodeposition coating using the electrodeposition coating composition of the present invention, an object to be coated is used as the cathode and dipped in the electrodeposition coating composition to apply voltage across the anode. An electrodeposition coating film is thereby precipitated on the object to be coated.

In the electrodeposition coating step, an object to be coated is dipped in the electrodeposition coating composition and then, a voltage of 50 to 450 V is applied to thereby perform electrodeposition coating. When the applied voltage is less than 50 V, insufficient electrodeposition may be obtained, whereas when the applied voltage exceeds 450 V, the coating film may be broken, exhibiting inferior appearance. When the electrodeposition coating is performed, the bath temperature of the coating composition is usually adjusted to 10 to 45° C.

The time required to apply voltage is generally designed to be 2 to 5 minutes though this differs depending on electrodeposition conditions.

The film thickness of the electrodeposition coating film is so designed that the film thickness of the cured electrodeposition coating film obtained finally is preferably 5 to 40 μm and more preferably 10 to 25 μm. When the film thickness of the electrodeposition coating film is less than 5 μm, there is a fear of deteriorated corrosion resistance. When the film thickness of the electrodeposition coating film exceeds 40 μm on the other hand, this leads to the waste of a coating.

The electrodeposition coating film obtained in the above manner is heated at 120 to 260° C. and preferably 140 to 220° C. for 10 to 30 minutes as it is or after washed with water after the electrodeposition process is finished, to thereby form a thermally cured electrodeposition coating film.

As the object to be coated with the electrodeposition coating composition of the present invention, various energizable objects to be coated may be used. Examples of the object that can be used include a cold rolled steel plate, hot rolled steel plate, stainless, electrolytic zinc-coated steel plate, hot-dip zinc-coated steel plate, zinc-aluminum alloy coated steel plate, zinc-iron alloy coated steel plate, zinc-magnesium alloy coated steel plate, zinc-aluminum-magnesium alloy coated steel plate, aluminum coated steel plate, aluminum-silicon alloy coated steel plate, and tin coated steel plate.

EXAMPLES

The present invention will be explained in more detail by way of examples, which are not intended to be limiting of the present invention, in which all designations of "parts" and "%" indicate parts by mass and % by mass, respectively, unless otherwise noted.

Production Example 1 Production of Pigment Dispersion Resin (D)

Preparation of 2-Ethylhexanol Half-Blocked Isophorone Diisocyanate

A reaction container equipped with a stirrer, a cooling tube, a nitrogen introduction tube, and a temperature gauge was charged with 222.0 parts of isophorone diisocyanate (hereinafter abbreviated as IPDI) which was then diluted with 39.1 parts of methyl isobutyl ketone (hereinafter abbreviated as MIBK) and then, 0.2 parts of dibutyltin dilaurate was added to the mixture. After that, the mixture was heated to 50° C. and 131.5 parts of 2-ethylhexanol was added dropwise to the mixture for 2 hours in a dry nitrogen atmosphere to obtain 2-ethylhexanol half-blocked IPDI (solid content: 90.0% by mass).

Preparation of Quaternarizing Agent 87.2 parts of dimethylethanolamine, 117.6 parts of an aqueous 75% lactic acid solution, and 39.2 parts of ethylene glycol mono-n-butyl ether were added sequentially and the mixture was stirred at 65° C. for 30 minutes to prepare a quaternarizing agent.

Production of Pigment Dispersion Resin

A reaction container was charged with 710.0 parts of a bisphenol A-type epoxy resin (trade name: DER-331J, manufactured by Dow Chemical Company) and 289.6 parts of bisphenol A and these compounds were reacted at 150 to 160° C. for 1 hour. Then, the reaction mixture was cooled to 120° C. and then, 498.8 parts of the 2-ethylhexanol half-blocked IPDI (MIBK solution) prepared previously was added to the mixture. The reaction mixture was stirred at 110 to 120° C. for 1 hour and 463.4 parts of ethylene glycol mono-n-butyl ether was added to the mixture, which was then cooled to 85 to 95° C., and 196.7 parts of the quaternarizing agent prepared previously was added to the mixture. The reaction mixture was kept at 85 to 95° C. until the acid value reached 1 and then, 964 parts of deionized water was added to the reaction mixture to obtain a target pigment dispersion resin (solid content: 50% by mass). A hydroxyl value of the resultant pigment dispersion resin was 75 mg KOH/g.

Production Example 2-1 Production of Aminated Resin (A-1)

92 parts of methyl isobutyl ketone, 940 parts of a bisphenol A-type epoxy resin (trade name: DER-331J, manufactured by Dow Chemical Company), 382 parts of bisphenol A, 63 parts of octylic acid, and 2 parts of dimethylbenzylamine were added in a reaction container and the reaction container was kept at 140° C. and the mixture was reacted until the epoxy equivalent was increased to 1110 g/eq, followed by cooling the mixture until the temperature in the reaction container was cooled to 120° C. Then, a mixture of 78 parts of diethylene triamine diketimine (methyl isobutyl ketone solution having a solid content of 73%) and 92 parts of diethanolamine was added to the reaction mixture to react at 120° C. for 1 hour to obtain an aminated resin (cation-modified epoxy resin). This resin had a number average molecular weight of 2,560, an amine value (milligram equivalent (MEQ(B)) of a base per 100 g of the solid content) of 50 mg KOH/g (among which the amine value derived from a primary amine was 14 mg KOH/g), and a hydroxyl value of 240 mg KOH/g.

Production Example 2-2 Production of Aminated Resin (A-2)

92 parts of methyl isobutyl ketone, 940 parts of a bisphenol A-type epoxy resin (trade name: DER-331J, manufactured by Dow Chemical Company), 382 parts of bisphenol A, 63 parts of octylic acid, and 2 parts of dimethylbenzylamine were added in a reaction container and the reaction container was kept at 140° C. and the mixture was reacted until the epoxy equivalent was increased to 850 g/eq, followed by cooling the mixture until the temperature in the reaction container was cooled to 120° C. Then, a mixture of 100 parts of diethylene triamine diketimine (methyl isobutyl ketone solution having a solid content of 73%) and 118 parts of diethanolamine was added to the reaction mixture to react at 120° C. for 1 hour to obtain an aminated resin (cation-modified epoxy resin). This resin had a number average molecular weight of 2,560, an amine value of 72 mg KOH/g (among which the amine value derived from a primary amine was 21 mg KOH/g), and a hydroxyl value of 270 mg KOH/g.

Production Example 2-3 Production of Aminated Resin (A-3)

92 parts of methyl isobutyl ketone, 940 parts of a bisphenol A-type epoxy resin (trade name: DER-331J, manufactured by Dow Chemical Company), 330 parts of bisphenol A, 130 parts of octylic acid, and 2 parts of dimethylbenzylamine were added in a reaction container and the reaction container was kept at 140° C. and the mixture was reacted until the epoxy equivalent was increased to 1150 g/eq, followed by cooling the mixture until the temperature in the reaction container was cooled to 120° C. Then, a mixture of 79 parts of diethylene triamine diketimine (methyl isobutyl ketone solution having a solid content of 73%) and 92 parts of diethanolamine was added to the reaction mixture to react at 120° C. for 1 hour to obtain an aminated resin (cation-modified epoxy resin). This resin had a number average molecular weight of 1,900, an amine value of 56 mg KOH/g (among which the amine value derived from a primary amine was 16 mg KOH/g), and a hydroxyl value of 245 mg KOH/g.

Production Example 3-1 Production of Blocked Isocyanate Curing Agent (B-1)

A reaction container was charged with 1680 parts of hexamethylene diisocyanate (HDI) and 732 parts of MIBK and the mixture was heated to 60° C. A mixture obtained by dissolving 346 parts of trimethyloipropane in 1067 parts of MEK oxime was added dropwise to the mixture at 60° C. for 2 hour. The mixture was further heated at 75° C. for 4 hours and then, it was confirmed that absorption derived from an isocyanate group disappeared in the measurement of an IR spectrum. After the reaction mixture was allowed to cool, 27 parts of MIBK was added to the mixture to obtain a blocked isocyanate curing agent (B-1) having a solid content of 78%. The isocyanate value was 252 mg KOH/g.

Production Example 3-2 Production of Blocked Isocyanate Curing Agent (B-2)

A reaction container was charged with 1340 parts of 4,4'-diphenylmethanediisocyanate and 277 parts of MIBK and the mixture was heated to 80° C. A mixture obtained by dissolving 226 parts of ε-caprolactam in 944 parts of butyl cellosolve was added dropwise to the mixture at 80° C. for 2 hour. The mixture was further heated at 100° C. for 4 hours and then, it was confirmed that absorption derived from an isocyanate group disappeared in the measurement of an IR spectrum. After the reaction mixture was allowed to cool, 349 parts of MIBK was added to the mixture to obtain a blocked isocyanate curing agent (B-2) (solid content: 80%). The isocyanate value was 251 mg KOH/g.

Production Example 4-1 Production of Amine-Modified Epoxy Resin Emulsion (ii-1)

350 parts (solid content) of the aminated resin (A-1) obtained in Production Example 2-1, 75 parts (solid content) of the blocked isocyanate curing agent (B-1) obtained in Production Example 3-1, and 75 parts (solid content) of the blocked isocyanate curing agent (B-2) obtained in Production Example 3-2 were mixed and ethylene glycol mono-2-ethylhexyl ether was added to the mixture in an amount of 3% (15 parts) based on the solid content of the mixture. Then, formic acid was added in an amount corresponding to a resin neutralization index of 40% to the mixture to neutralize and then, the mixture was slowly diluted by adding ion exchange water, followed by removing methyl isobutyl ketone under reduced pressure in such a manner that the solid content of the mixture was 40% to thereby obtain an amine-modified epoxy resin emulsion (ii-1). Incidentally, the aminated resin (A-1) used in the preparation of amine-modified epoxy resin emulsion was used as an amine-modified epoxy resin emulsion (E).

Production Example 4-2 Production of Amine-Modified Epoxy Resin Emulsion (ii-2)

350 parts (solid content) of the aminated resin (A-1) obtained in Production Example 2-1 and ethylene glycol mono-2-ethylhexyl ether was added to the mixture in an amount of 3% (15 parts) based on the solid content of the mixture. Then, formic acid was added in an amount corresponding to a resin neutralization index of 40% to the mixture to neutralize and then, the mixture was slowly diluted by adding ion exchange water, followed by removing methyl isobutyl ketone under reduced pressure in such a manner that the solid content of the mixture was 40% to thereby obtain an amine-modified epoxy resin emulsion (ii-2).

Production Example 4-3 Production of Amine-Modified Epoxy Resin Emulsion (ii-3)

350 parts (solid content) of the aminated resin (A-1) obtained in Production Example 2-1, 75 parts (solid content) of the blocked isocyanate curing agent (B-1) obtained in Production Example 3-1, and 75 parts (solid content) of the blocked isocyanate curing agent (B-2) obtained in Production Example 3-2 were mixed and ethylene glycol mono-2-ethylhexyl ether was added to the mixture in an amount of 3% (15 parts) based on the solid content of the mixture. Then, acetic acid was added in an amount corresponding to a resin neutralization index of 40% to the mixture to neutralize and then, the mixture was slowly diluted by adding ion exchange water, followed by removing methyl isobutyl ketone under reduced pressure in such a manner that the solid content of the mixture was 40% to thereby obtain an amine-modified epoxy resin emulsion (ii-3).

Production Example 4-4 Production of Amine-Modified Epoxy Resin Emulsion (ii-4)

350 parts (solid content) of the aminated resin (A-2) obtained in Production Example 2-2, 75 parts (solid content) of the blocked isocyanate curing agent (B-1) obtained in Production Example 3-1, and 75 parts (solid content) of the blocked isocyanate curing agent (B-2) obtained in Production Example 3-2 were mixed and ethylene glycol mono-2-ethylhexyl ether was added to the mixture in an amount of 3% (15 parts) based on the solid content of the mixture. Then, formic acid was added in an amount corresponding to a resin neutralization index of 40% to the mixture to neutralize and then, the mixture was slowly diluted by adding ion exchange water, followed by removing methyl isobutyl ketone under reduced pressure in such a manner that the solid content of the mixture was 40% to thereby obtain an amine-modified epoxy resin emulsion (ii-4).

Production Example 4-5 Production of Amine-Modified Epoxy Resin Emulsion (ii-5)

350 parts (solid content) of the aminated resin (A-3) obtained in Production Example 2-3, 75 parts (solid content) of the blocked isocyanate curing agent (B-1) obtained in Production Example 3-1, and 75 parts (solid content) of the blocked isocyanate curing agent (B-2) obtained in Production Example 3-2 were mixed and ethylene glycol mono-2-ethylhexyl ether was added to the mixture in an amount of 3% (15 parts) based on the solid content of the mixture. Then, formic acid was added in an amount corresponding to a resin neutralization index of 40% to the mixture to neutralize and then, the mixture was slowly diluted by adding ion exchange water, followed by removing methyl isobutyl ketone under reduced pressure in such a manner that the solid content of the mixture was 40% to thereby obtain an amine-modified epoxy resin emulsion (ii-5).

Example 1

Production of Pigment Dispersion Paste

In order to obtain a solid concentration of 45% by mass weight of a dispersion paste, 120 parts of ion exchange water, 3.1 parts of an aqueous 50% lactic acid solution, and 4 parts of bismuth oxide were mixed with stirring during which 200 parts of the pigment dispersion resin (D) obtained in Production Example 1 was added to the mixture and then, the mixture was stirred at ambient temperature and 1000 rpm for 1 hour to prepare a mixture. Then, 25 parts of the amine-modified epoxy resin emulsion (ii-1) obtained in production Example 4-1 was further added to the mixture and further, 1 part of carbon, 40 parts of titanium oxide and 59 parts of Satintone (a calcined kaolin) were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 496 parts of ion exchange water, 316 parts of the amine-modified epoxy resin emulsion (ii-1) (which was used as a resin emulsion (i)) obtained in Production Example 4-1, and 144 parts of the pigment dispersion paste obtained above were added and the mixture was aged at 40° C. for 16 hours to obtain an electrodeposition coating composition.

Example 2

Production of Pigment Dispersion Paste

A pigment dispersion paste was obtained in the same manner as in Example 1 except that an amount of the pigment dispersion resin (D) was changed to 70 parts.
Production of Cationic Electrodeposition Coating Composition In a stainless container, 490 parts of ion exchange water, 366 parts of the amine-modified epoxy resin emulsion (ii-1) (which was used as a resin emulsion (i)) obtained in Production Example 4-1, and 99 parts of the pigment dispersion paste obtained above were added and the mixture was aged at 40° C. for 16 hours to obtain an electrodeposition coating composition.

Example 3

Production of Pigment Dispersion Paste

A pigment dispersion paste was obtained in the same manner as in Example 1 except that an amount of the pigment dispersion resin (D) was changed to 20 parts.
Production of Cationic Electrodeposition Coating Composition In a stainless container, 488 parts of ion exchange water, 385 parts of the amine-modified epoxy resin emulsion (ii-1) (which was used as a resin emulsion (i)) obtained in Production Example 4-1, and 82 parts of the pigment dispersion paste obtained above were added and the mixture was aged at 40° C. for 16 hours to obtain an electrodeposition coating composition.

Example 4

Production of Pigment Dispersion Paste

In order to obtain a solid concentration of 45% by mass weight of a dispersion paste, 115 parts of ion exchange water, 3.1 parts of an aqueous 50% lactic acid solution, and 4 parts of bismuth oxide were mixed with stirring, further 70 parts of the pigment dispersion resin (D) obtained in Production Example 1 was added to the mixture, and then, the mixture was stirred at ambient temperature and 1000 rpm for 1 hour. Next, 75 parts of the amine-modified epoxy resin emulsion (ii-1) obtained in production Example 4-1 was further added to the mixture and further, 1 part of carbon, 40 parts of titanium oxide and 59 parts of Satintone (a calcined kaolin) were added to the mixture as a pigment, followed by stirring at 40° C. and 2000 rpm for 1 hour by using a sand mill, to obtain a pigment dispersion paste.
Production of Cationic Electrodeposition Coating Composition In a stainless container, 492 parts of ion exchange water, 350 parts of the amine-modified epoxy resin emulsion (ii-1) (which was used as a resin emulsion (i)) obtained in Production Example 4-1, and 113 parts of the pigment dispersion paste obtained above were added and the mixture was aged at 40° C. for 16 hours to obtain an electrodeposition coating composition.

Example 5

A pigment dispersion paste was obtained in the same manner as in Example 2 except that an amount of the amine-modified epoxy resin emulsion (ii-1) was changed to 5 parts. Using the resultant pigment dispersion paste, an electrodeposition coating composition was obtained in the same manner as in Example 2.

Example 6

A pigment dispersion paste was obtained in the same manner as in Example 2 except that a type of an amine-modified epoxy resin emulsion was changed from (ii-1) to (ii-2) and used 25 parts. Using the resultant pigment dispersion paste, an electrodeposition coating composition was obtained in the same manner as in Example 2.

Example 7

A pigment dispersion paste was obtained in the same manner as in Example 2 except that a type of an amine-modified epoxy resin emulsion was changed from (ii-1) to (ii-3) and used 25 parts. Using the resultant pigment dispersion paste, an electrodeposition coating composition was obtained in the same manner as in Example 2.

Example 8

A pigment dispersion paste was obtained in the same manner as in Example 2 except that a type of an amine-modified epoxy resin emulsion was changed from (ii-1) to (ii-4) and used 25 parts. Using the resultant pigment dispersion paste, an electrodeposition coating composition was obtained in the same manner as in Example 2.

Example 9

A pigment dispersion paste was obtained in the same manner as in Example 2 except that a type of an amine-modified epoxy resin emulsion was changed from (ii-1) to (ii-5) and used 25 parts. Using the resultant pigment dispersion paste, an electrodeposition coating composition was obtained in the same manner as in Example 2.

Example 10

A pigment dispersion paste was obtained in the same manner as in Example 2 except that 3.1 parts of an aqueous 50% lactic acid solution was changed to 2.4 parts of dimethylolpropionic acid. Using the resultant pigment dispersion paste, an electrodeposition coating composition was obtained in the same manner as in Example 2.

Example 11

A pigment dispersion paste was obtained in the same manner as in Example 2 except that 3.1 parts of an aqueous 50% lactic acid solution was changed to 2.1 parts of an aqueous 80% methanesulfonic acid solution. Using the resultant pigment dispersion paste, an electrodeposition coating composition was obtained in the same manner as in Example 2.

Example 12

A pigment dispersion paste was obtained in the same manner as in Example 2 except that 4 parts of bismuth oxide was changed to 4.5 parts of bismuth hydroxide. Using the resultant pigment dispersion paste, an electrodeposition coating composition was obtained in the same manner as in Example 2.

Example 13

Production of Pigment Dispersion Paste 70 parts of the pigment dispersion resin (D) obtained in Production Example 1, 1 part of carbon, 40 parts of titanium oxide and 59 parts of Satintone as a pigment were added and dispersed. In an another container, 120 parts of ion exchange water, 3.1 parts of an aqueous 50% lactic acid solution, and 4 parts of bismuth oxide were mixed with stirring, further 25 parts of the amine-modified epoxy resin emulsion (ii-1) obtained in production Example 4-1 was added to the mixture, and then, the mixture was stirred at ambient temperature and 1000 rpm for 1 hour. The resultant mixture was added to the above dispersion and mixed to obtain a pigment dispersion paste.

Production of Cationic Electrodeposition Coating Composition

In a stainless container, 490 parts of ion exchange water, 366 parts of the amine-modified epoxy resin emulsion (ii-1) (which was used as a resin emulsion (i)) obtained in Production Example 4-1, and 99 parts of the pigment dispersion paste obtained above were added and the mixture was aged at 40° C. for 16 hours to obtain an electrodeposition coating composition.

Example 14

An electrodeposition coating composition was obtained in the same manner as in Example 2 except that a neodymium acetate aqueous solution (concentration: 10% by mass) was further added such that a concentration in terms of metal element of a rare earth metal based on the total mass of an electrodeposition coating composition became 500 ppm (0.005% by mass).

Example 15

An electrodeposition coating composition was obtained in the same manner as in Example 2 except that a neodymium acetate aqueous solution (concentration: 10% by mass) was further added such that a concentration in terms of metal element of a rare earth metal based on the total mass of an electrodeposition coating composition became 1000 ppm (0.01% by mass).

Comparative Example 1

Production of Pigment Dispersion Paste

In order to obtain a solid concentration of 45% by mass weight of a dispersion paste, 122 parts of ion exchange water, 3.1 parts of an aqueous 50% lactic acid solution, and 4 parts of bismuth oxide were mixed with stirring during which 70 parts of the pigment dispersion resin (D) obtained in Production Example 1 was added to the mixture and then, the mixture was stirred at ambient temperature and 1000 rpm for 1 hour to prepare a mixture.

Then, 1 part of carbon, 40 parts of titanium oxide and 59 parts of Satintone were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 489 parts of ion exchange water, 373 parts of the amine-modified epoxy resin emulsion (ii-1) (which was used as a resin emulsion (i)) obtained in Production Example 4-1, and 92 parts of the pigment dispersion paste obtained above were added and the mixture was aged at 40° C. for 16 hours to obtain an electrodeposition coating composition.

Comparative Example 2

Production of Pigment Dispersion Paste

In order to obtain a solid concentration of 45% by mass weight of a dispersion paste, 113 parts of ion exchange water, 3.1 parts of an aqueous 50% lactic acid solution, and 4 parts of bismuth oxide were mixed and stirred at ambient temperature and 1000 rpm for 1 hour. Then, 25 parts of the amine-modified epoxy resin emulsion (ii-1) was added thereto, and 1 part of carbon, 40 parts of titanium oxide and 59 parts of Satintone were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 487 parts of ion exchange water, 393 parts of the amine-modified epoxy resin emulsion (ii-1) (which was used as a resin emulsion (i)) obtained in Production Example 4-1, and 75 parts of the pigment dispersion paste obtained above were added and the mixture was aged at 40° C. for 16 hours to obtain an electrodeposition coating composition.

Comparative Example 3

Production of Pigment Dispersion Paste

In order to obtain a solid concentration of 45% by mass weight of a dispersion paste, 113 parts of ion exchange water, 3.1 parts of an aqueous 50% lactic acid solution, and 4 parts of bismuth oxide were mixed and stirred at ambient temperature and 1000 rpm for 1 hour. Then, 88 parts of the amine-modified epoxy resin emulsion (ii-1) was added thereto, and 1 part of carbon, 40 parts of titanium oxide and 59 parts of Satintone were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 490 parts of ion exchange water, 374 parts of the amine-modified epoxy resin emulsion (ii-1) (which was used as a resin emulsion (i)) obtained in Production Example 4-1, and 92 parts of the pigment dispersion paste obtained above were added and the mixture was aged at 40° C. for 16 hours to obtain an electrodeposition coating composition.

Comparative Example 4

Production of Pigment Dispersion Paste

In order to obtain a solid concentration of 45% by mass weight of a dispersion paste, 122 parts of ion exchange water and 4 parts of bismuth oxide were mixed with stirring during which 70 parts of the pigment dispersion resin (D) obtained in Production Example 1 was added to the mixture and then, the mixture was stirred at ambient temperature and 1000 rpm for 1 hour to prepare a mixture. Then, 1 part of carbon, 40 parts of titanium oxide and 59 parts of Satintone were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 490 parts of ion exchange water, 374 parts of the amine-modified epoxy resin emulsion (ii-1) (which was used as a resin emulsion (i)) obtained in Production Example 4-1, and 92 parts of the pigment dispersion paste obtained above were added and the mixture was aged at 40° C. for 16 hours to obtain an electrodeposition coating composition.

Comparative Example 5

Production of Pigment Dispersion Paste

In order to obtain a solid concentration of 45% by mass weight of a dispersion paste, 138 parts of ion exchange water, 3.1 parts of an aqueous 50% lactic acid solution, and 4 parts of bismuth oxide were mixed with stirring during which 200 parts of the pigment dispersion resin (D) obtained in Production Example 1 was added to the mixture and then, the mixture was stirred at ambient temperature and 1000 rpm for 1 hour to prepare a bismuth mixture. Then, 1 part of carbon, 40 parts of titanium oxide and 59 parts of Satintone were added to the mixture as a pigment, followed by stirring at 40° C. and 2000 rpm for 1 hour by using a sand mill, to obtain a pigment dispersion paste.

Production of Cationic Electrodeposition Coating Composition

In a stainless container, 495 parts of ion exchange water, 324 parts of the amine-modified epoxy resin emulsion (ii-1) (which was used as a resin emulsion (i)) obtained in Production Example 4-1, and 137 parts of the pigment dispersion paste obtained above were added and the mixture was aged at 40° C. for 16 hours to obtain an electrodeposition coating composition.

Electrodeposition coating compositions prepared by methods of the above Examples and Comparative Examples were used to make the following evaluation.

Production of Electrodeposition Coating Plate Having a Cured Electrodeposition Coating Film A cold rolled plate (JIS G3141, SPCC-SD) was dipped in Surfcleaner EC90 (manufactured by Nippon Paint Co., Ltd.) at 50° C. for 2 minutes to perform degreasing treatment. Next, the degreased plate was dipped in Surffine GL1 (manufactured by Nippon Paint Co., Ltd.) at normal temperature for 30 seconds and further in Surfdine 6350 (manufactured by Nippon Paint Co., Ltd.) at 35° C. for 2 min. The plate was then washed with deionized water. In the meantime, 2-ethylhexyl glycol was added to each electrodeposition coating composition obtained in the examples and comparative examples in an amount necessary to allow an electrodeposition coating film to have a film thickness of 15 μm after cured. Thereafter, the steel plate was wholly sunk in the electrodeposition coating composition and then, application of voltage was immediately started. In this case, voltage was applied in the condition that it was raised for 30 seconds to 180 V and then kept at this voltage for 150 seconds to precipitate an uncured electrodeposition coating film on the object (cold rolled plate) to be coated. The obtained uncured electrodeposition coating film was heated at 160° C. for 15 minutes to cure, thereby obtaining an electrodeposition coating plate having a cured electrodeposition coating film.

Appearance of Cured Electrodeposition Coating Film (Coating Appearance on Horizontal Surfaces)

Each of the electrodeposition coating compositions obtained in the above examples and comparative examples was stirred at 1000 rpm, then the stirring was stopped. A steel plate was wholly sunk in the electrodeposition coating composition in the horizontal direction, and was hold for 3 minutes, then, application of voltage was started. In this case, voltage was applied in the condition that it was raised for 30 seconds to 180 V and then kept at this voltage for 150 seconds to precipitate an uncured electrodeposition coating film on the object (cold rolled plate) to be coated. The obtained uncured electrodeposition coating film was heated at 160° C. for 15 minutes to cure, thereby obtaining an electrodeposition coating plate having a cured electrodeposition coating film. With regard to an electrodeposition coating plate provided with a cured electrodeposition coating film obtained by performing coating according to the above method, it was visually observed as to whether or not there is any disorder in appearance of coating films of top surface (front surface) and bottom surface (back surface). The standard of evaluation was as follows.

Evaluation Standard

○: Both of the coating films (top and back) have uniform coating film appearance, and have no uneven part.

○Δ: The coating films (top and back) have almost uniform coating film appearance as a whole though it is visually observed that there are somewhat uneven parts (it does not involve practical problems).

Δ: The coating films (top and back) have uneven parts that are visually observed, and have unevenness coating appearance as a whole (it involves practical problems).

x: Both of the coating films (top and back) are visually observed as being significantly uneven (it involves practical problems).

Storage Stability of Pigment Dispersion Paste

Each of the pigment dispersion pastes used in the preparation of electrodeposition coating compositions in the above examples and comparative examples was stored at 40° C. for 1 month, then properties of the pigment dispersion paste after storage was visually evaluated. The standard of evaluation was as follows.

Evaluation Standard

○: Neither separation nor sedimentation formation is observed.

Δ: Although soft sedimentation is observed, it returns to a uniform state by stirring and does not become a big problem in use.

x: A hard sedimentation is observed, and even when agitates, it does not become a uniform state.

Storage Stability of Electrodeposition Coating Composition

Electrodeposition coating compositions obtained in the above examples and comparative Examples were stored at 40° C. for 1 month, then property of the coating composition after storage was evaluated by filterability of the coating composition.

The standard of evaluation was as follows.

Evaluation Standard

○: Easily passes through 508 mesh (N-NO 508 S, manufactured by NBC Meshtec Ltd., opening: 20 μm).

Δ: Though passing a 508 mesh has a little time, there is no problem in manufacturing work.

x: It cannot pass through 508 mesh, which is a problem in manufacturing work.

Dispersibility

In the preparation of the pigment dispersion paste prepared in each examples and comparative examples, when mixing the pigment dispersion paste, after stirring at 2000 rpm for 1 hour at 40° C. using a sand mill, a particle size of the paste was measured using a grain gauge. Then, visual observation was carried out. The standard of evaluation was as follows.

Evaluation Standard
○: Particle size is less than 5 μm.
○Δ: Particle size is 5 μm or more and less than 10 μm.
Δ: Particle size is 5 μm or more and less than 10 μm.
x: particle size is 15 μm or more.

Curability

The cured electrodeposition coating film obtained by performing coating according to the above method was dipped in acetone and refluxed under heating at 56° C. for 4 hour. The cured electrodeposition coating film after refluxed was dried and coating film residual rate was calculated from the masses of the coating film before and after the film was dipped in acetone according to the following equation to thereby evaluate curability. The standard of evaluation was as follows.

Coating film residual rate=$Y/X$ where X=Mass of Coating film before dipped in acetone; Y=Mass of Coating film after dipped in acetone.

Evaluation Standard
○: The coating film residual rate: 90% or more.
Δ: The coating film residual rate: 85% or more and less than 90% (there is no practical problem).
x: The coating film residual rate: less than 85% (there is a practical problem).

Edge Corrosion Test

This test was evaluated using not the above cold rolled plate but a L-type exclusive new razor blade (LB10K, manufactured by OLFA CORPORATION) which was dipped in Surfcleaner EC90 (manufactured by Nippon Paint Co., Ltd.) at 50° C. for 2 minutes to perform degreasing treatment, surface-conditioned by Surffine GL-1 (manufactured by Nippon Paint Co., Ltd.), and then, dipped in Surfdyne SD-5000 (manufactured by Nippon Paint Co., Ltd., zinc phosphate chemical treatment solution) at 40° C. for 2 minutes to perform zinc phosphate chemical treatment. Each electrodeposition coating composition obtained in the above examples and comparative examples was applied to the surface-treated razor blade by electrodeposition coating in the same condition as in the above electrodeposition coating and then, cured by heating to form a cured electrodeposition coating film. Then, a salt spray test (35° C.×168 hour) was made according to JIS Z 2371 (2000) to examine the number of rusts generated on the end portion of the L-type exclusive new razor blade.

Evaluation Standard
⊚: Less than 10 rusts.
○: 10 rusts or more and less than 20 rusts.
○Δ: 20 rusts or more and less than 50 rusts.
Δ: 50 rusts or more and less than 100 rusts.
x: 100 rusts or more.

TABLE 1

| | | | Example 1 | Example 2 | Example 3 | Example 4 | Example 5 | Example 6 | Example 7 |
|---|---|---|---|---|---|---|---|---|---|
| Pigment dispersion paste | Bismuth compound (c1) (concentration (ppm) in pigment dispersion paste) | Bismuth oxide Bismuth hydroxide | 8634 | 12381 | 14870 | 13186 | 12381 | 12381 | 12381 |
| | Organic acid (c2) | Lactic acid | ○ | ○ | ○ | ○ | ○ | ○ | ○ |
| | | DMPA | | | | | | | |
| | | MSA | | | | | | | |
| | Pigment dispersion resin (D) | | ○ | ○ | ○ | ○ | ○ | ○ | ○ |
| | Emulsion (ii) containing amine-modified epoxy resin (E) | ii-1 | ○ | ○ | ○ | ○ | ○ | | |
| | | ii-2 | | | | | | ○ | |
| | | ii-3 | | | | | | | ○ |
| | | ii-4 | | | | | | | |
| | | ii-5 | | | | | | | |
| | Pigment (F) | | ○ | ○ | ○ | ○ | ○ | ○ | ○ |
| | Neodymium acetate (concentration (ppm) in electrodeposition coating composition) | | | | | | | | |
| Ratio of components D, E, F | Pigment (F)/Pigment dispersion paste (D) | | 1/1 | 1/0.35 | 1/0.1 | 1/0.35 | 1/0.35 | 1/0.35 | 1/0.35 |
| | Pigment (F)/Amine-modified epoxy resin (E) | | 1/0.1 | 1/0.1 | 1/0.1 | 1/0.3 | 1/0.02 | 1/0.1 | 1/0.1 |
| Performance | Coating appearance | | ○ | ○ | ○ | ○ | ○Δ | ⊚ | ○Δ |
| | Stability | Pigment disperson paste | ○Δ | ○ | ○ | ○Δ | ○Δ | ○ | ○ |
| | | Electrodeposition coating composition | ○ | ○ | ○ | ○ | ○ | ○ | ○ |
| | Dispersibility | | ○ | ○ | ○Δ | ○ | ○ | ○ | ○ |
| | Edge corrosion test | | Δ | Δ | Δ | Δ | Δ | Δ | Δ |
| | Curability | | ○Δ | ○ | ○ | ○ | ○ | ○ | ○ |

TABLE 2

| | | | Example 8 | Example 9 | Example 10 | Example 11 | Example 12 | Example 13 | Example 14 | Example 15 |
|---|---|---|---|---|---|---|---|---|---|---|
| Pigment dispersion paste | Bismuth compound (c1) (concentration (ppm) in pigment dispersion paste) | Bismuth oxide Bismuth hydroxide | 12381 | 12381 | 12381 | 12381 | 13816 | 12381 | 12381 | 12381 |
| | Organic acid (c2) | Lactic acid | ○ | ○ | | | ○ | ○ | ○ | ○ |
| | | DMPA | | | ○ | | | | | |

TABLE 2-continued

|  |  |  | Example 8 | Example 9 | Example 10 | Example 11 | Example 12 | Example 13 | Example 14 | Example 15 |
|---|---|---|---|---|---|---|---|---|---|---|
|  |  | MSA |  |  |  | ○ |  |  |  |  |
|  | Pigment dispersion resin (D) |  | ○ | ○ | ○ | ○ | ○ | ○ | ○ | ○ |
| Emulsion (ii) containing amine-modified epoxy resin (E) | ii-1 |  |  |  | ○ | ○ | ○ | ○ | ○ | ○ |
|  | ii-2 |  |  |  |  |  |  |  |  |  |
|  | ii-3 |  |  |  |  |  |  |  |  |  |
|  | ii-4 |  | ○ |  |  |  |  |  |  |  |
|  | ii-5 |  |  | ○ |  |  |  |  |  |  |
|  | Pigment (F) |  | ○ | ○ | ○ | ○ | ○ | ○ | ○ | ○ |
|  | Neodymium acetate (concentration (ppm) in electrodeposition coating composition) |  |  |  |  |  |  |  | 500 | 1000 |
| Ratio of components D, E, F | Pigment (F)/Pigment dispersion paste (D) |  | 1/0.35 | 1/0.35 | 1/0.35 | 1/0.35 | 1/0.35 | 1/0.35 | 1/0.35 | 1/0.35 |
|  | Pigment (F)/Amine-modified epoxy resin (E) |  | 1/0.1 | 1/0.1 | 1/0.1 | 1/0.1 | 1/0.1 | 1/0.1 | 1/0.1 | 1/0.1 |
| Performance | Coating appearance |  | ◎ | ○ | ○ | ○ | ○ | ○ | ◎ | ○ |
|  | Stability | Pigment disperson paste | ○ | ◎ | ○ | ○ | ○ | ○ | ○ | ○ |
|  |  | Electrodeposition coating composition | ○ | ○ | ○ | ○ | ○ | ○ | ○ | ○ |
|  | Dispersibility |  | ○ | ○ | ○ | ○ | ○ | ○ | ○ | ○ |
|  | Edge corrosion test |  | Δ | Δ | Δ | Δ | Δ | Δ | ○ | ◎ |
|  | Curability |  | ○ | ○ | ○ | ○ | ○ | ○ | ○ | ○ |

TABLE 3

|  |  |  | Comparative Example 1 | Comparative Example 2 | Comparative Example 3 | Comparative Example 4 | Comparative Example 5 |
|---|---|---|---|---|---|---|---|
| Pigment dispersion paste | Bismuth compound (c1) (concentration (ppm) in pigment dispersion paste) | Bismuth oxide | 13421 | 16167 | 10732 | 13421 | 12381 |
|  |  | Bismuth hydroxide |  |  |  |  |  |
|  | Organic acid (c2) | Lactic acid | ○ | ○ | ○ |  | ○ |
|  |  | DMPA |  |  |  |  |  |
|  |  | MSA |  |  |  |  |  |
|  | Pigment dispersion resin (D) |  | ○ |  |  | ○ | ○ |
| Emulsion (ii) containing amine-modified epoxy resin (E) | ii-1 |  |  | ○ | ○ |  |  |
|  | ii-2 |  |  |  |  |  |  |
|  | ii-3 |  |  |  |  |  |  |
|  | ii-4 |  |  |  |  |  |  |
|  | ii-5 |  |  |  |  |  |  |
|  | Pigment (F) |  | ○ | ○ | ○ | ○ | ○ |
|  | Neodymium acetate (concentration (ppm) in electrodeposition coating composition) |  |  |  |  |  |  |
| Ratio of components D, E, F | Pigment (F)/Pigment dispersion paste (D) |  | 1/0.35 | 1/0 | 1/0 | 1/0.35 | 1/1 |
|  | Pigment (F)/Amine-modified epoxy resin (E) |  | 1/0 | 1/0.1 | 1/0.35 | 1/0 | 1/0 |
| Performance | Coating appearance |  | X | Δ | Δ | ○ | X |
|  | Stability | Pigment disperson paste | Δ | X | X | X | Δ |
|  |  | Electrodeposition coating composition | ○ | X | X | X | ○ |
|  | Dispersibility |  | ○ | X | X | X | ○ |
|  | Edge corrosion test |  | Δ | Δ | Δ | Δ | Δ |
|  | Curability |  | ○ | ○Δ | ○Δ | X | ○Δ |

It was confirmed that each of the electrodeposition coating compositions and pigment dispersion pastes obtained by Examples and Comparative examples had excellent dispersion stability. Furthermore, each of the electrodeposition coating compositions had good curability and also, obtained cured electrodeposition coating films obtained from the compositions had good coating film appearance. Furthermore, it was confirmed that electrodeposition coating compositions containing rare earth metal had high edge rust preventive ability.

Comparative Example 1 was an example in which no amine-modified epoxy resin (E) was used in preparation of the pigment dispersion paste. The electrodeposition coating film obtained by Comparative Example 1 had inferior dispersion stability of pigment dispersion paste. Also the obtained cured electrodeposition coating film had greatly inferior coating appearance.

Both of Comparative Examples 2 and 3 used no pigment dispersion paste (D). Both of the electrodeposition coating films obtained by Comparative Examples 1 and 2 had inferior dispersion stability and dispersion performance of pigment dispersion paste and electrodeposition coating composition. Also the obtained cured electrodeposition coating films had inferior coating appearance.

Comparative Example 4 used no amine-modified epoxy resin (E) in preparation of the pigment dispersion paste, and used no organic acid (c2) in preparation of the pigment dispersion paste. The electrodeposition coating film obtained by Comparative Example 4 had greatly inferior dispersion stability and dispersion performance of pigment dispersion paste and electrodeposition coating composition. Also, the electrodeposition coating composition had greatly inferior curability.

Comparative Example 5 was an example in which no amine-modified epoxy resin (E) was used in preparation of the pigment dispersion paste. The electrodeposition coating film obtained by Comparative Example 5 had inferior dispersion stability of pigment dispersion paste. Also the obtained cured electrodeposition coating film had greatly inferior coating appearance. Furthermore, the electrodeposition coating composition had inferior curability.

INDUSTRIAL APPLICABILITY

The method for preparing a cationic electrodeposition coating composition of the present invention can provide a cationic electrodeposition coating composition containing a bismuth compound, which is superior in stability of coating composition, curability, coating appearance and the like. The preparation method of the present invention can easily prepare a cationic electrodeposition coating composition having excellent stability of coating composition, curability, coating appearance, even if it contains substantially no organic tin compound or lead compound.

The invention claimed is:

1. A method for preparing a cationic electrodeposition coating composition, wherein the method comprises the steps of:
    preparing a resin emulsion (i) by respectively dissolving an aminated resin (A) and a blocked isocyanate curing agent (B) in organic solvents to prepare respective solutions, mixing the respective solutions to achieve a mixed solution, and then neutralizing the mixed solution with a neutralizing acid to obtain the resin emulsion (i) comprising the aminated resin (A) and the blocked isocyanate agent (B),
    preparing a pigment dispersion paste comprising a bismuth mixture (C) obtained by mixing a bismuth compound (c1) and an organic acid (c2) in advance; a pigment dispersion resin (D); an amine-modified epoxy resin emulsion (ii) comprising an amine-modified epoxy resin (E); and a pigment (F), according to any one of the following methods of:
        mixing the bismuth mixture (C) and the pigment dispersion resin (D), then the obtained mixture being mixed with the amine-modified epoxy resin emulsion (ii), and next, the pigment (F) being mixed in the obtained mixture;
        mixing the bismuth mixture (C), the pigment dispersion resin (D) and the amine-modified epoxy resin emulsion (ii), and then the pigment (F) being mixed in the obtained mixture; or
        mixing the bismuth mixture (C) and the amine-modified epoxy resin emulsion (ii), and then, the obtained mixture, the pigment dispersion resin (D) and the pigment (F) being mixed, and
    mixing the resin emulsion (i) and the pigment dispersion paste to obtain the cationic electrodeposition coating composition, wherein
        the pigment dispersion resin (D) has a hydroxyl value of 20 to 120 mg KOH/g, and
        the amine-modified epoxy resin (E) has a primary amino group, a hydroxyl value of 150 to 650 mg KOH/g, and an amine value of 20 to 80 mg KOH/g.

2. The method for preparing a cationic electrodeposition coating composition according to claim 1, wherein:
    the cationic electrodeposition coating composition obtained by the method comprises the bismuth compound (c1) in an amount of 0.05 to 1.0% by mass in terms of metal element based on a resin solid content of the resin emulsion (i).

3. The method for preparing a cationic electrodeposition coating composition according to claim 1, wherein:
    a ratio of pigment (F)/pigment dispersion resin (D) in the pigment dispersion paste is 1/0.1 to 1/1 in terms of solid content mass ratio; and
    a ratio of pigment (F)/amine-modified epoxy resin (E) in the pigment dispersion paste is 1/0.02 to 1/0.3 in terms of solid content mass ratio.

4. The method for preparing a cationic electrodeposition coating composition according to claim 1, wherein:
    the amine-modified epoxy resin (E) has a number average molecular weight of 1000 to 5000, and
    a milligram equivalent (MEQ (B)) of a base per 100 g of the solid content of the amine-modified epoxy resin (E) is 50 to 350.

5. The method for preparing a cationic electrodeposition coating composition according to claim 1, wherein:
    the amine-modified epoxy resin emulsion (ii) is an emulsion neutralized with one or more acid(s) selected from the group consisting of formic acid, acetic acid and lactic acid.

6. The method for preparing a cationic electrodeposition coating composition according to claim 1, wherein:
    the organic acid (c2) is one or more selected from the group consisting of lactic acid, dimethylolpropionic acid and methanesulfonic acid.

7. The method for preparing a cationic electrodeposition coating composition according to claim 1, wherein:
    the cationic electrodeposition coating composition further comprises a salt (G) of a rare earth metal selected from the group consisting of neodymium, yttrium, lanthanum, cerium, praseodymium, and ytterbium.

8. A cationic electrodeposition coating composition obtained by the method for preparing a cationic electrodeposition coating composition according to claim 1.

9. A cationic electrodeposition coating composition comprising a resin emulsion (i) and a pigment dispersion paste, wherein:
    the resin emulsion (i) comprises an aminated resin (A) and a blocked isocyanate curing agent (B),
    the pigment dispersion paste comprises a bismuth mixture (C) obtained by mixing a bismuth compound (c1) and an organic acid (c2) in advance; a pigment dispersion resin (D); an amine-modified epoxy resin emulsion (ii) comprising an amine-modified epoxy resin (E); and a pigment (F),
    the pigment dispersion resin (D) has a hydroxyl value of 20 to 120 mg KOH/g,
    the amine-modified epoxy resin (E) has a primary amino group, a hydroxyl value of 150 to 650 mg KOH/g, an amine value of 20 to 80 mg KOH/g, and a number average molecular weight of 1000 to 5000,
    a milligram equivalent (MEQ (B)) of a base per 100 g of the solid content of the amine-modified epoxy resin (E) is 50 to 350, and
    the pigment dispersion paste is prepared according to any one of the following methods of:
        mixing the bismuth mixture (C) and the pigment dispersion resin (D), then the obtained mixture being mixed with the amine-modified epoxy resin emulsion (ii), and next, the pigment (F) being mixed in the obtained mixture;

mixing the bismuth mixture (C), the pigment dispersion resin (D) and the amine-modified epoxy resin emulsion (ii), and then the pigment (F) being mixed in the obtained mixture; or mixing the bismuth mixture (C) and the amine-modified epoxy resin emulsion (ii), and then, the obtained mixture, the pigment dispersion resin (D) and the pigment (F) being mixed.

10. The cationic electrodeposition coating composition according to claim 9, wherein the coating composition further comprises a salt (G) of a rare earth metal selected from the group consisting of neodymium, yttrium, lanthanum, cerium, praseodymium, and ytterbium.

* * * * *